US012401133B2

(12) United States Patent
Lin et al.

(10) Patent No.: US 12,401,133 B2
(45) Date of Patent: Aug. 26, 2025

(54) REFLECTION APPARATUS AND SYSTEM

(71) Applicant: SoftBank Corp., Tokyo (JP)

(72) Inventors: Hoyu Lin, Tokyo (JP); Ryuji Kuse, Kumamoto (JP); Takeshi Fukusako, Kumamoto (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/051,152

(22) Filed: Feb. 11, 2025

(65) Prior Publication Data

US 2025/0183546 A1 Jun. 5, 2025

Related U.S. Application Data

(63) Continuation of application No. PCT/JP2023/029607, filed on Aug. 16, 2023.

(30) Foreign Application Priority Data

Aug. 25, 2022 (JP) ................................ 2022-133725

(51) Int. Cl.
*H01Q 15/14* (2006.01)
*H01Q 15/00* (2006.01)
*H01Q 19/10* (2006.01)

(52) U.S. Cl.
CPC ....... *H01Q 15/148* (2013.01); *H01Q 15/0013* (2013.01)

(58) Field of Classification Search
CPC .... H01Q 15/00; H01Q 15/0013; H01Q 15/14; H01Q 15/148; H01Q 19/10
See application file for complete search history.

(56) References Cited

U.S. PATENT DOCUMENTS 8,912,888 B2 * 12/2014 Yoshida ........... G06K 19/07749 343/834
8,988,759 B2 * 3/2015 Bowers .................. G02B 1/005 359/263

(Continued)

FOREIGN PATENT DOCUMENTS

CN 110854538 A 2/2020
JP 2015046821 A 3/2015

(Continued)

OTHER PUBLICATIONS

Decision to Grant a Patent issued for counterpart Japanese Application No. 2022-133725, transmitted from the Japanese Patent Office on May 30, 2023 (drafted on May 22, 2023).

(Continued)

*Primary Examiner* — Tho G Phan

(57) ABSTRACT

A reflection apparatus which reflects a radio wave includes a first device including first units each including a first base body having a first surface and a second surface provided along an emission direction of the reflected wave, a first element provided on the first surface, and a second element provided on the second surface to be shifted in position from the first element in the emission direction, and a second device including second units each including a second base body having a third surface and a fourth surface provided along the emission direction, a third element provided on the third surface, and a fourth element provided on the fourth surface, and the first device is provided separated from the second device, and a relative positional relationship between the first device and the second device in a direction along the second surface is adjustable.

20 Claims, 11 Drawing Sheets

(56) References Cited

U.S. PATENT DOCUMENTS

| | | | | |
|---|---|---|---|---|
| 10,938,118 | B2 * | 3/2021 | Takikawa | H01Q 15/147 |
| 11,303,020 | B2 * | 4/2022 | Fang | F04B 7/145 |
| 11,777,226 | B2 * | 10/2023 | Nakajima | H01Q 19/026 343/840 |
| 12,074,382 | B2 * | 8/2024 | Okita | H01Q 21/0006 |

FOREIGN PATENT DOCUMENTS

| | | | |
|---|---|---|---|
| JP | 2021158600 | A | 10/2021 |
| WO | 2022253534 | A1 | 12/2022 |

OTHER PUBLICATIONS

International Search Report and Written Opinion (ISA/237) of the International Search Authority for International Patent Application No. PCT/JP2023/029607, mailed by the Japan Patent Office on Oct. 3, 2023.

* cited by examiner

FIRST COMPARATIVE EXAMPLE

FIRST COMPARATIVE EXAMPLE

SECOND COMPARATIVE EXAMPLE

SECOND COMPARATIVE EXAMPLE

REFLECTION APPARATUS AND SYSTEM

The contents of the following patent application(s) are incorporated herein by reference:

NO. 2022-133725 filed in JP on Aug. 25, 2022

NO. PCT/JP2023/029607 filed in WO on Aug. 16, 2023.

BACKGROUND

1. Technical Field

The present invention relates to a reflection apparatus and a system.

2. Related Art

In Patent Document 1, a reflector array in which a large number of elements as small as a wavelength are arranged in a planar shape is described as a reflector that reflects radio waves.

PRIOR ART DOCUMENTS

Patent Documents

Patent Document 1: Japanese Patent Application Publication No. 2015-46821

DESCRIPTION OF EXEMPLARY EMBODIMENTS

Figure 1:
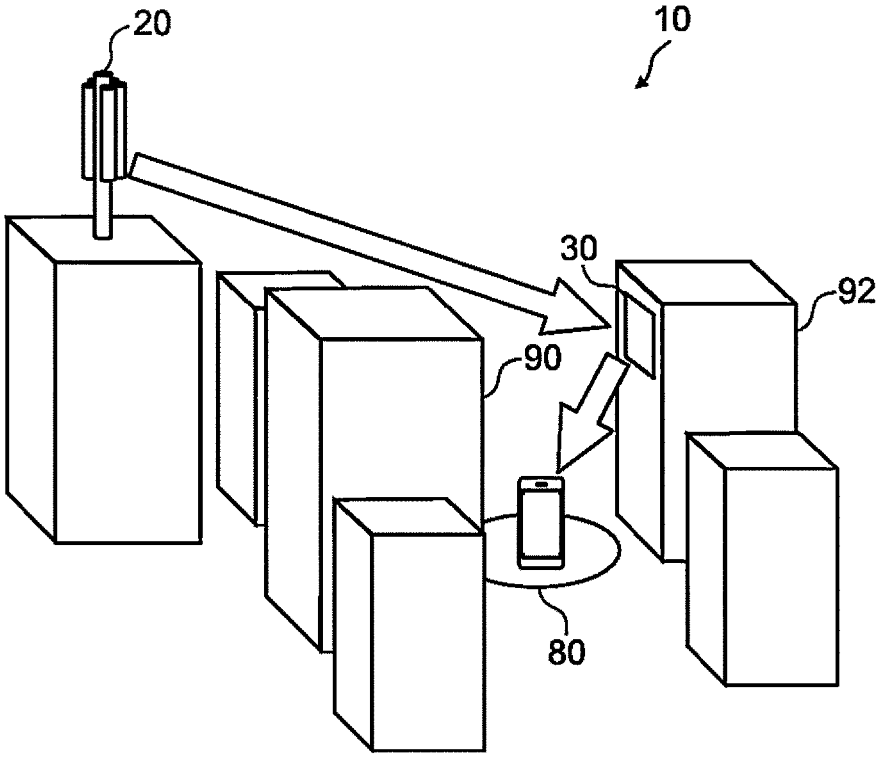
FIG. 1 schematically shows an example of a configuration of a system 10 including a reflection apparatus 30.

For example, in a 5th generation mobile communication system, radio waves in a relatively high frequency band are used. Since radio waves in a high frequency band have high straightness, it is difficult for the radio waves to diffract around an obstacle such as a building to reach a shadow zone. For this reason, many coverage holes (areas in which communication cannot be performed) are generated in an area that is invisible from a base station, and a communication coverage area may be narrowed. Therefore, in order to expand the communication coverage area, it is necessary to install a large number of base stations. Accordingly, a cost for expanding the communication area increases.

A reflector is provided in a construction such as a building, and a radio wave radiated from a base station is reflected by the reflector, so that the radio wave can reach an area which is the shadow zone of the obstacle. As the reflector for this purpose, a meta-surface reflector capable of making an incident angle and a reflection angle of a radio wave different has been studied.

In order to effectively reduce the coverage holes, it is desirable that the phase of the reflected wave is adjustable in order to adjust the reflection angle. As the meta-surface reflector capable of adjusting the phase of the reflected wave, a configuration using a material having a variable dielectric constant (for example, liquid crystal or the like), a configuration in which a plurality of varactor diodes or PIN diodes are arranged in each cell for adjusting impedance, and the like are considered. However, in these configurations, power is required to maintain the reflection angle in a specific direction. In the configuration using diodes or PIN diodes, a cell structure becomes complicated, and the manufacturing cost of the reflector increases.

On the other hand, in the system 10 including the reflection apparatus 30 according to the present embodiment, the reflection apparatus 30 has a structure in which the first device 110 and the second device 120 are separated from each other. This allows for adjusting the relative in-plane positions of the first device 110 and the second device 120, thereby enabling the adjustment of the phase of the reflected wave. Accordingly, the manufacturing cost of the reflection apparatus 30 is reduced, while power for maintaining the reflection angle of the radio wave in a specific direction becomes substantially unnecessary. Furthermore, in the reflection apparatus 30, an additional element is provided between the first device 100 and the second device 200, thereby enabling the expansion of the phase change amount of the reflected wave in an operation frequency band. Accordingly, it becomes possible to expand a communication coverage area through a base station. Therefore, the number of base stations can be suppressed, so that the cost for expanding the communication coverage area can be reduced.

Hereinafter, the present invention will be described through embodiments of the invention, but the following embodiments do not limit the invention according to the claims. In addition, not all of the combinations of features described in the embodiments are essential to the solution of the invention.

FIG. 1 schematically shows an example of a configuration of the system 10 including the reflection apparatus 30. The system 10 includes a base station 20 and the reflection apparatus 30. In the present embodiment, the system 10 is a mobile communication system. The base station 20 radiates radio waves for mobile communication.

The radio waves radiated by the base station 20 include a radio wave in a frequency band that can be used in the 5th generation mobile communication system. Specifically, the radio waves radiated by the base station 20 may include a radio wave in a frequency band equal to or higher than the frequency band of the S-band. The radio waves radiated by the base station 20 may include a radio wave in a frequency band equal to or higher than the frequency band of the C-band. The radio waves radiated by the base station 20 may include a radio wave in submillimeter to millimeter wave bands. In the present embodiment, the radio waves radiated by the base station 20 include, for example, a radio wave of 5.77 GHz.

For example, the radio wave in the frequency band equal to or higher than the frequency band of the S-band is less likely to diffract around an obstacle such as a building to reach a shadow zone than a radio wave in a frequency band (for example, a 700 MHz band and an 800 MHz band) equal to or lower than the frequency band of the L-band. An area 80 is located in a shadow zone of a building 90 as viewed from the base station 20. For this reason, the strength of a radio wave radiated from the base station 20 and directly reaching the area 80 becomes significantly weak.

The reflection apparatus 30 reflects the radio wave radiated from the base station 20. The reflection apparatus 30 is provided, for example, on a wall surface of a building 92 located in a line-of-sight range of the base station 20. The reflection apparatus 30 reflects an incident radio wave in a specific direction. The reflection apparatus 30 is configured to be able to adjust a direction in which the reflection apparatus 30 reflects a radio wave. The reflection apparatus 30 is adjusted such that the radio wave radiated from the base station 20 and incident on the reflection apparatus 30 is reflected by the reflection apparatus 30 and travels toward the area 80. The reflection apparatus 30 enables the radio wave radiated from the base station 20 to reach the area 80. Accordingly, it is possible to expand the communication coverage area through the base station 20 without adding a base station. Therefore, the cost for expanding the communication coverage area can be reduced.

Figure 2:
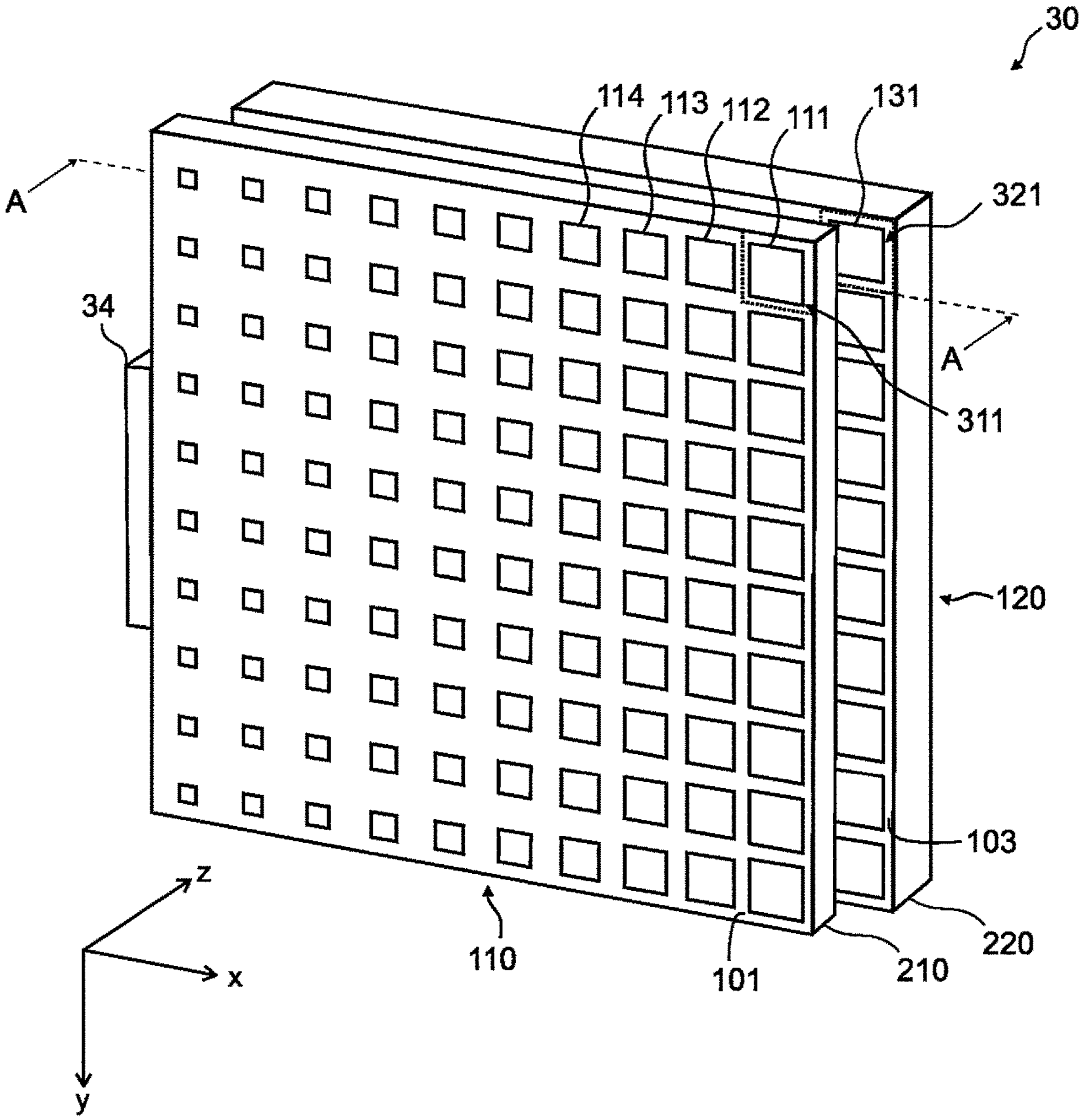
FIG. 2 is a perspective view schematically showing the reflection apparatus 30.
Figure 3:
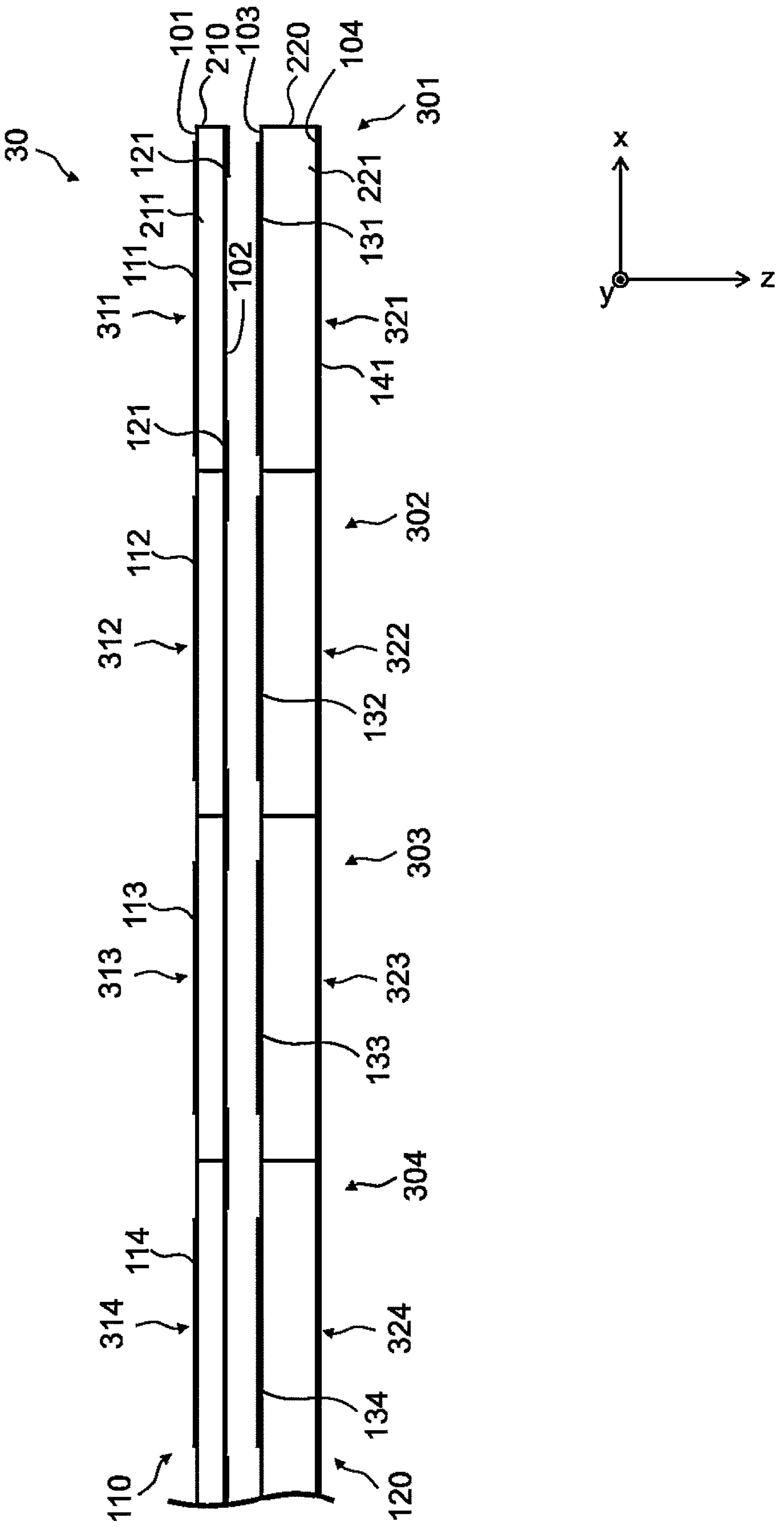
FIG. 3 shows a case where relative positions of a first device 110 and a second device 120 included in the reflection apparatus 30 are aligned.
Figure 4:
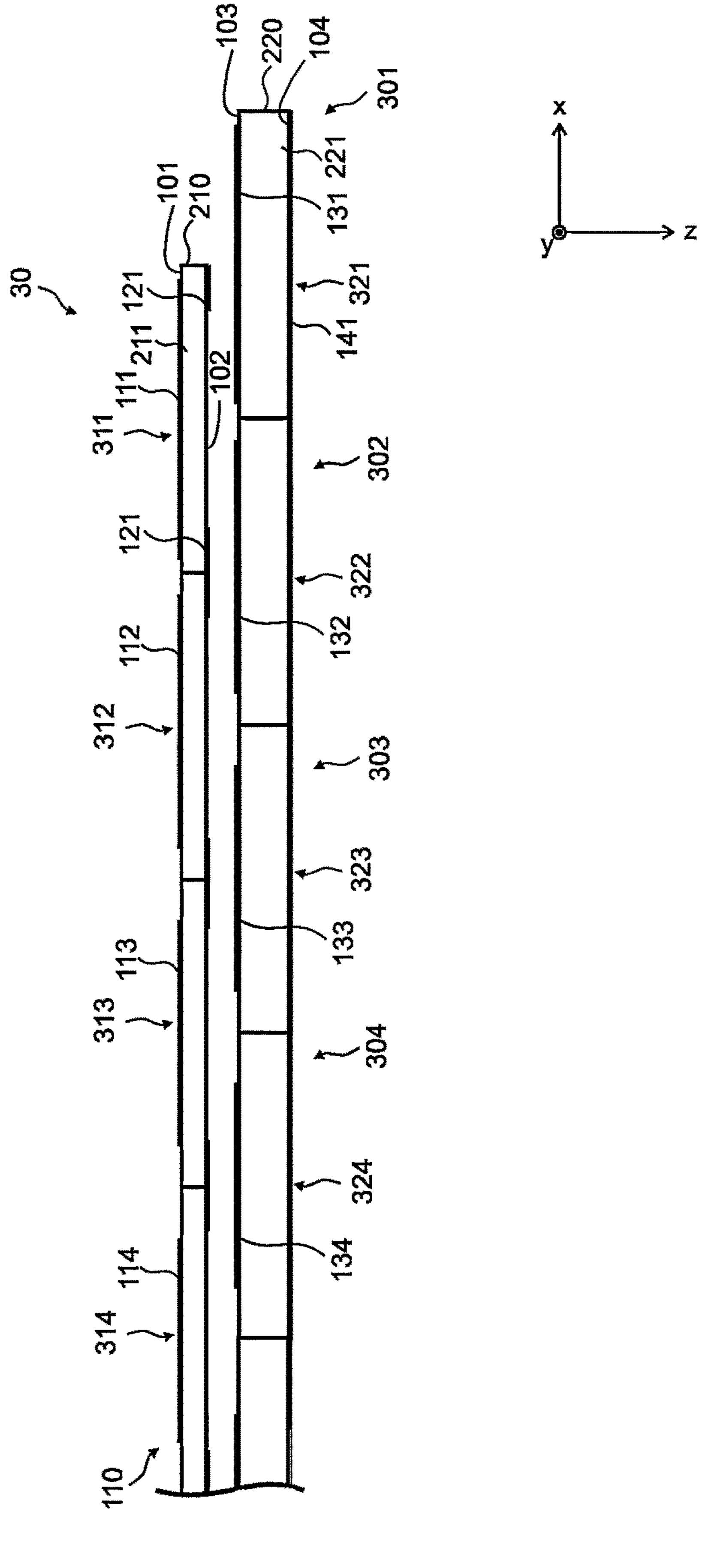
FIG. 4 shows a part of a cross section of the reflection apparatus 30 taken along line A-A in FIG. 2.

FIG. 2 is a perspective view schematically showing the reflection apparatus 30. FIGS. 3 and 4 show a part of a cross section of the reflection apparatus 30 taken along line A-A in FIG. 2. FIG. 3 shows a case where relative positions of the first device 110 and the second device 120 included in reflection apparatus 30 are aligned. FIG. 4 shows a case where the relative positions of the first device 110 and the second device 120 are not aligned, and the first device 110 is displaced with respect to the second device 120.

In the drawings of the present embodiment, coordinate axes may be shown to describe the configuration of the reflection apparatus 30. In the drawings of the present embodiment, coordinate axes are shown for the purpose of representing directions. An x axis and a y axis of the coordinate axes are set in a plane parallel to a main surface of the reflection apparatus 30. In the direction of a z axis of the coordinate axes, generally, a direction in which an incident wave is incident on the reflection apparatus 30 is defined as positive, and a direction in which a reflected wave is emitted is defined as negative.

The configuration of the reflection apparatus 30 will be described with reference to FIGS. 2 to 4. The reflection apparatus 30 reflects radio waves. The reflection apparatus 30 includes the first device 110 and the second device 120 provided along an emission direction of a reflected wave, and an adjustment apparatus 34.

The first device 110 provides an incident surface on which an incident wave, which is a radio wave incident on the reflection apparatus 30, can be directly incident, and an output surface of a reflected wave. A radio wave having passed through the first device 110 are incident on the second device 120. The first device 110 is located on a negative z-axis side with respect to the second device 120. The first device 110 may be a device located closer to the base station 20 than the second device 120.

The first device 110 has a configuration in which a plurality of elements including a first element 111, a first element 112, a first element 113, and a first element 114 are arranged in a matrix on a first substrate 210. Similarly, the second device 120 has a configuration in which a plurality of elements similar to the first elements are arranged in a matrix on a second substrate 220.

The first device 110 includes a first unit 311 including a first base body 211 having a first surface 101 and a second surface 102 provided along the emission direction of a reflected wave, the first element 111 provided on the first surface 101, and a second element 121 provided on the second surface 102 to be shifted in position from the first element 111 in the emission direction of the reflected wave.

The second surface 102 is a surface opposite to the first surface 101. The first surface 101 is located on the negative z-axis side with respect to the second surface 102.

As shown in FIG. 2, the first device 110 has a configuration in which a plurality of first units having configurations same as or similar to that of the first unit 311 are arranged in a matrix.

Specifically, in the first device 110, the first units arranged in a direction along the x axis have configurations same as each other except that the sizes of the first elements included in the respective units are different from each other. For example, as shown in FIGS. 2 and 3 or the like, the first element 111 of the first unit 311 is larger than the first element 112 of a first unit 312, the first element 112 of the first unit 312 is larger than the first element 113 of a first unit 313, and the first element 113 of the first unit 313 is larger than the first element 114 of a first unit 314. On the other hand, the first units arranged in a direction along the y axis have configurations same as each other. Accordingly, the wave reflected by the reflection apparatus 30 can have phases different from each other at different positions in an x-axis direction.

For convenience of description, the first device 110 is described as including a configuration in which a plurality of first units are arranged, but the plurality of first units indicate specific parts of the first device 110, and does not mean that the plurality of first units are a plurality of separate members. Similarly, the first base body indicates a specific part of the first substrate 210, and the first substrate 210 may be integrally configured by one member.

The second device 120 includes a second unit 320 including a second base body 221 having a third surface 103 and a fourth surface 104 provided along the emission direction of a reflected wave, a third element 131 provided on the third surface 103, and a fourth element 141 provided on the fourth surface.

The fourth surface 104 is a surface opposite to the third surface 103. The third surface 103 is located on the negative z-axis side with respect to the fourth surface 104. The second surface 102 and the second element 121 are surfaces that can face at least a part of the third surface 103 and the third element 131.

Similarly to the first device 110, the second device 120 has a configuration in which a plurality of second units having configurations same as or similar to that of the second unit 321 are arranged in a matrix.

Specifically, in the second device 120, the second units arranged in the direction along the x axis have configurations same as each other except that the sizes of the third elements included in the respective units are different from each other. For example, as shown in FIG. 3 or the like, the third element 131 of the second unit 321 is larger than a third element 132 of a second unit 322, the third element 132 of the second unit 322 is larger than a third element 133 of a second unit 323, and the third element 133 of the second unit 323 is larger than a first element 134 of a second unit 324. On the other hand, the second units arranged in the direction along the y axis have configurations same as each other.

For convenience of description, the second device 120 is described as including a configuration in which a plurality of second units are arranged, but the plurality of second units indicate specific parts of the second device 120, and does not mean that the plurality of second units are a plurality of separate members. Similarly, the second base body indicates a specific part of the second substrate 220, and the second substrate 220 may be integrally configured by one member.

The first element 111, the second element 121, the third element 131, and the fourth element 141 are conductors. As an example, the first element 111 and the third element 131 are conductors having a frequency selective surface (FSS). The fourth element 141 is a ground conductor and provides a reflecting surface for radio waves. A radio wave incident on the reflection apparatus 30 passes through the first device 110, enters the second device 120, is reflected by the fourth element, passes through the second device 120 and the first device 110, and is emitted as a reflected wave to the outside. A phase difference is generated in the radio wave incident on the reflection apparatus 30 by the members constituting the first device 110 and the members constituting the second device 120, and the radio wave is emitted as a reflected wave from the reflection apparatus 30, from the first device 110 to the outside of the reflection apparatus 30.

The first device 110 is provided separated from the second device 120. A relative positional relationship between the first device 110 and the second device 120 in a direction along the second surface 102 is adjustable. Specifically, the second device 120 is fixed, and the first device 110 can be displaced relative to the second device 120 in the direction along the x axis.

The adjustment apparatus 34 adjusts the relative positional relationship between the first device 110 and the second device 120. For example, the adjustment apparatus 34 is attached to the first device 110 and displaces the first device 110 in the direction along the x axis. The adjustment apparatus 34 may include a displacement mechanism that displaces a moving member fixed to the first device 110 with an adjustment member such as a screw.

The phase of the reflected wave is determined by surface areas of the first element 111 and the second element 121, a relative positional relationship between the first element 111 and the second element 121, a thickness of the first base body 211, surface areas of third element 131 and fourth element 141, and a thickness of second base body 221. The phase of the reflected wave is further determined by an interval between the first substrate 210 and the second substrate 220, a dielectric constant of the first substrate 210, and a dielectric constant of the second substrate 220. As described above, the phase of the reflected wave is not electrically determined, but is determined by a mechanical structure of the reflection apparatus 30.

The plurality of first units included in the first device 110 and the plurality of second units included in the second device 120 are provided at a plurality of positions along a specific direction along the first surface 101, such that the phases of the reflected wave are different from each other. Specifically, the plurality of first units and the plurality of second units are provided such that the reflected wave propagates in a specific direction.

The plurality of first units included in the first device 110 and the plurality of second units included in the second device 120 are provided such that, for example, a phase difference of the reflected wave varies by a certain amount between the plurality of first units included in the first device 110 in the x-axis direction. In this case, the wave reflected by reflection apparatus 30 propagates in a specific direction.

By changing a relative position of the first device 110 with respect to the second device 120 along the x-axis direction, the arrangement of the plurality of first elements and the plurality of second elements 121 included in the first device 110 and a plurality of third elements 131 included in the second device 120 is changed, so that the phase difference of the reflected wave in the x-direction is changed. Accordingly, it is possible to change a direction in which the wave reflected by the reflection apparatus 30 propagates. Therefore, the direction in which the wave reflected by the reflection apparatus 30 propagates can be adjusted by adjusting the relative position of the first device 110 with respect to the second device 120 along the x-axis direction. Accordingly, in a case where the reflection apparatus 30 is installed in the building 90, the direction in which the wave reflected by the reflection apparatus 30 propagates can be adjusted so as to eliminate a coverage hole of the base station 20.

Figure 5:
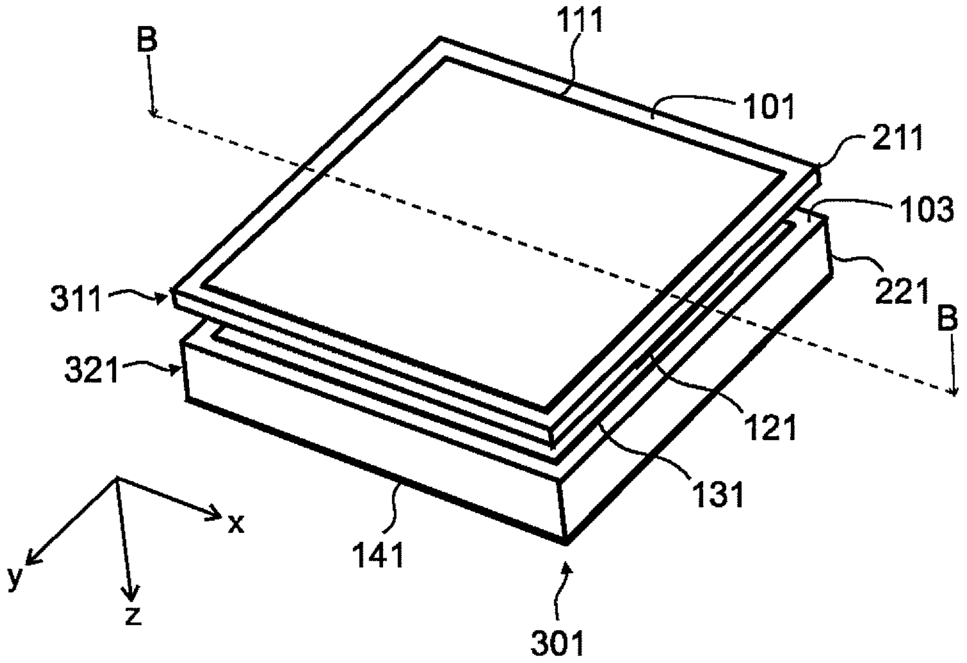
FIG. 5 is a perspective view of a unit 301 including a first unit 311 and a second unit 321.
Figure 6:
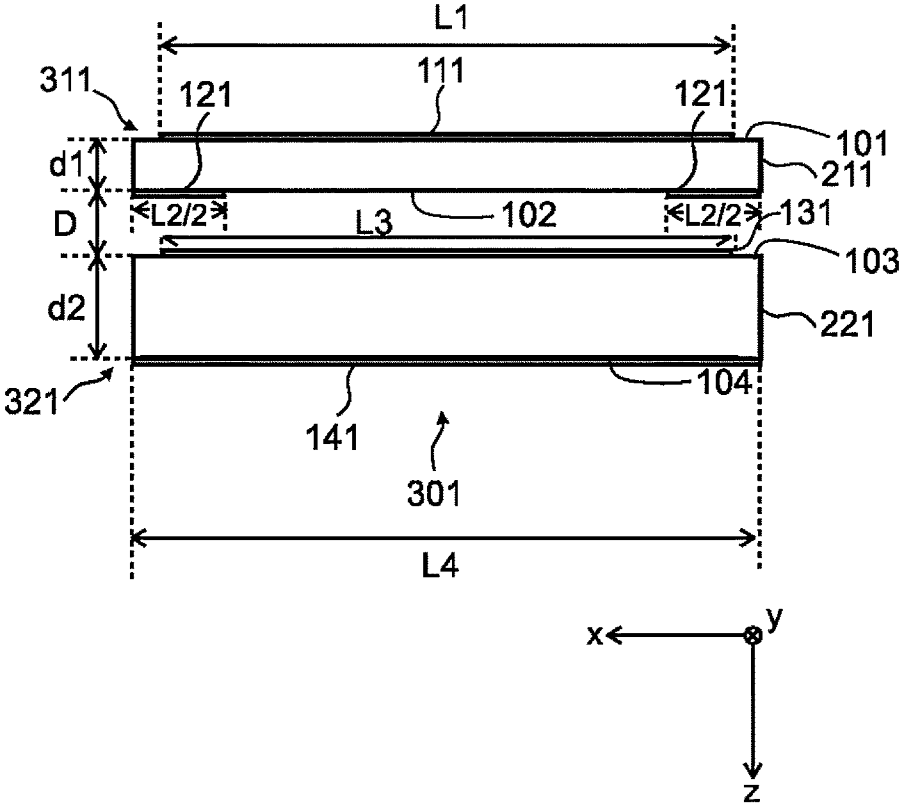
FIG. 6 shows a cross section of the unit 301 taken along line B-B in FIG. 5.

An example of a specific structure of the first unit 311 and the second unit 321 will be described with reference to FIGS. 5 and 6. FIG. 5 is a perspective view of a unit 301 including the first unit 311 and the second unit 321. FIG. 6 shows a cross section of the unit 301 taken along line B-B in FIG. 5. FIGS. 5 and 6 are diagrams in a case where the positions of the first device 110 and the second device 120 are aligned.

As shown in FIG. 6, in the unit 301, the second elements 121 are located at an end on a positive x-axis side and an end on a negative x-axis side on the second surface 102. The second element 121 is located at the center of the second surface 102 in a y-axis direction.

In this manner, the second element 121 is provided at a position shifted from the first element 111. For example, in a case where the first element 111 and the second element 121 are projected on an xy plane, the range occupied by the first element 111 and the range occupied by the second element 121 do not coincide with each other in the xy plane. That is, the first element 111 and the second element 121 are provided such that a region where the second element 121 does not overlap the first element 111 exists and/or a region where the first element 111 does not overlap the second element 121 exists when viewed in a z-axis direction.

In the present embodiment, when viewed in the z-axis direction, the shapes of the first base body 211 and the second base body 221 are square. When viewed in the z-axis direction, the shapes of the first element 111, the second element 121, and the third element 131 are square.

Assuming that a wavelength of a radio wave incident on the reflection apparatus 30 is λ, a length of one side of the first unit 311 is 0.38λ, and a length of one side of the second unit 321 is 0.38λ. Specifically, a length of one side of the first base body 211 is 0.38), and a length of one side of the second base body 221 is 0.38λ.

A thickness d1 of the first base body 211 is 0.03λ, and a dielectric constant of the first base body 211 is 2.16. A thickness d2 of the second base body 221 is 0.06λ, and a dielectric constant of the second base body 221 is 2.56. An interval D between the first base body 211 and the second base body 221 is 0.038λ.

A length L1 of one side of the first element 111 is 0.346λ. A length L2 of one side of the second element 121 is 0.11λ. Since the second element 121 is provided to be shared with the adjacent first unit, a length of the second element 121 in the x-axis direction with respect to the portion occupied by the second element 121 in the second unit is L2/2. A thickness of the first element 111 and a thickness of the second element 121 are 0.000346λ.

A length L3 of one side of the third element 131 is 0.346λ. A length of one side of the portion occupied by the fourth element 141 in the second unit 321 is 0.38λ. A thickness of the third element 131 and a thickness of the fourth element are 0.000346λ.

Figure 7:
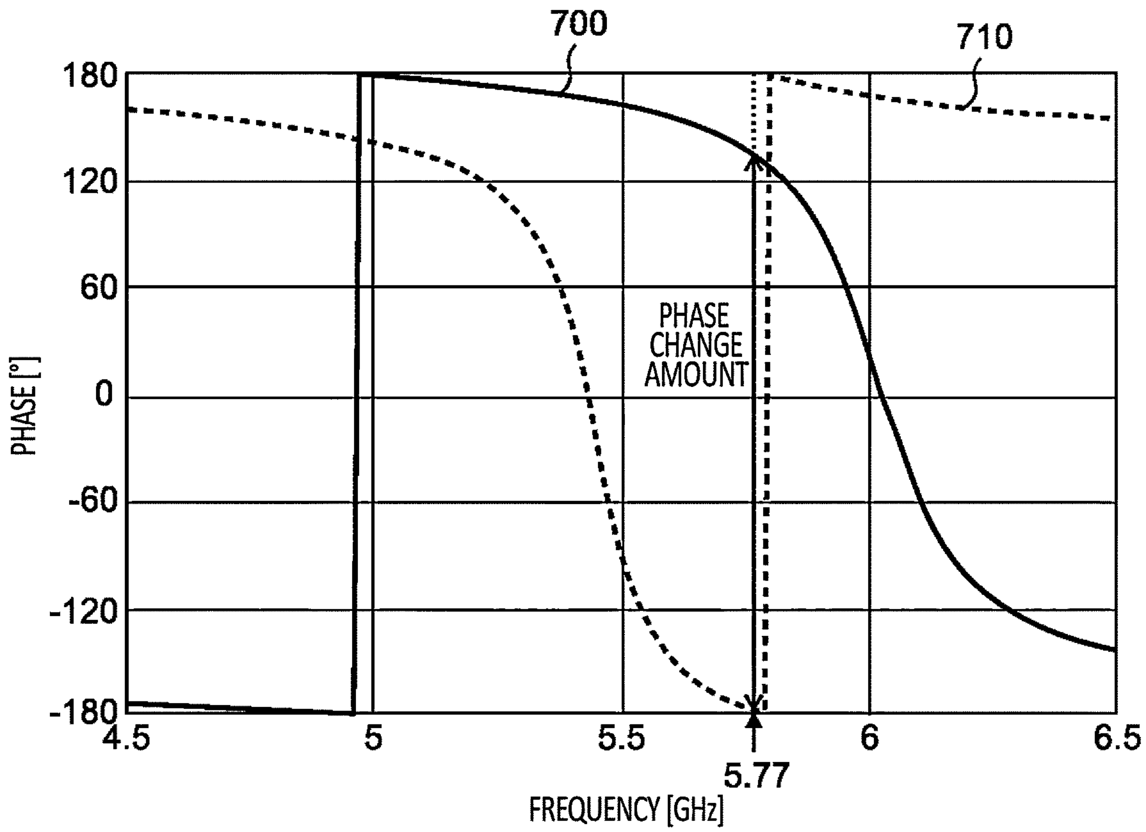
FIG. 7 is a graph showing a phase change amount obtained by displacing the first device 110 with respect to the second device 120.

With reference to FIG. 7, a phase difference of a reflected wave obtained in a case where the first device 110 is displaced with respect to the second device 120 will be described. Here, it is assumed that a frequency of a target radio wave is 5.77 GHz.

FIG. 7 is a graph showing a phase change amount obtained by displacing the first device 110 with respect to the second device 120. A line 700 indicates the phase of the reflected wave in a case where the position of the first device 110 and the position of the second device 120 are aligned.

When the first device 110 is displaced with respect to the second device 120, a difference (phase change amount) from the phase indicated by the line 700 may occur. Here, a phase difference from the phase corresponding to 5.77 GHz on the line 700 is referred to as a "phase change amount". A line 710 indicates the phase of the reflected wave in a case where the first device 110 is displaced with respect to the second device 120 and the second device 120 is fixed at a position where the phase change amount is maximized.

As shown in FIG. 7, in the present embodiment, the phase change amount is 312.7° at the maximum. That is, in the present embodiment, the phase can be adjusted within a range of 312.7°. That is, by displacing the first device 110 with respect to the second device 120, a reflection angle of the reflected wave can be made relatively large.

Figure 8:
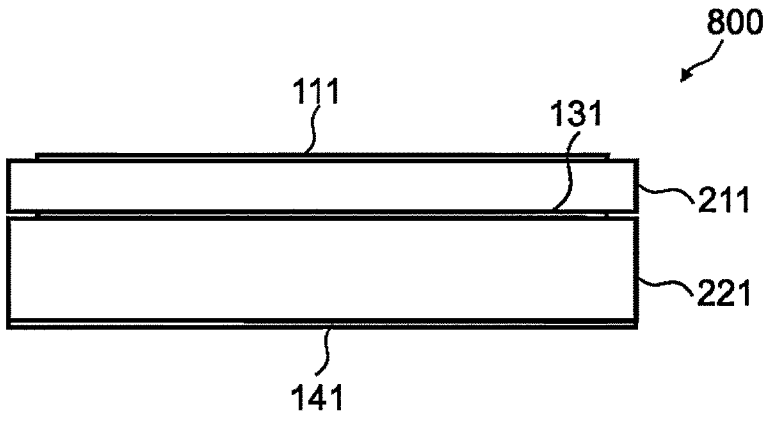
FIG. 8 schematically shows a unit 800 included in a reflector in a first comparative example.

FIG. 8 schematically shows a unit 800 included in a reflector in a first comparative example. The unit 800 is a unit corresponding to the unit 301 shown in FIG. 6. The unit 800 differs from the unit 301 in that the unit 800 does not have the second element 121, and the first base body 211 is not substantially separated from the second base body 221. In the first comparative example, the position of the first base body 211 with respect to the second base body 221 cannot be displaced after manufacturing.

Figure 9:
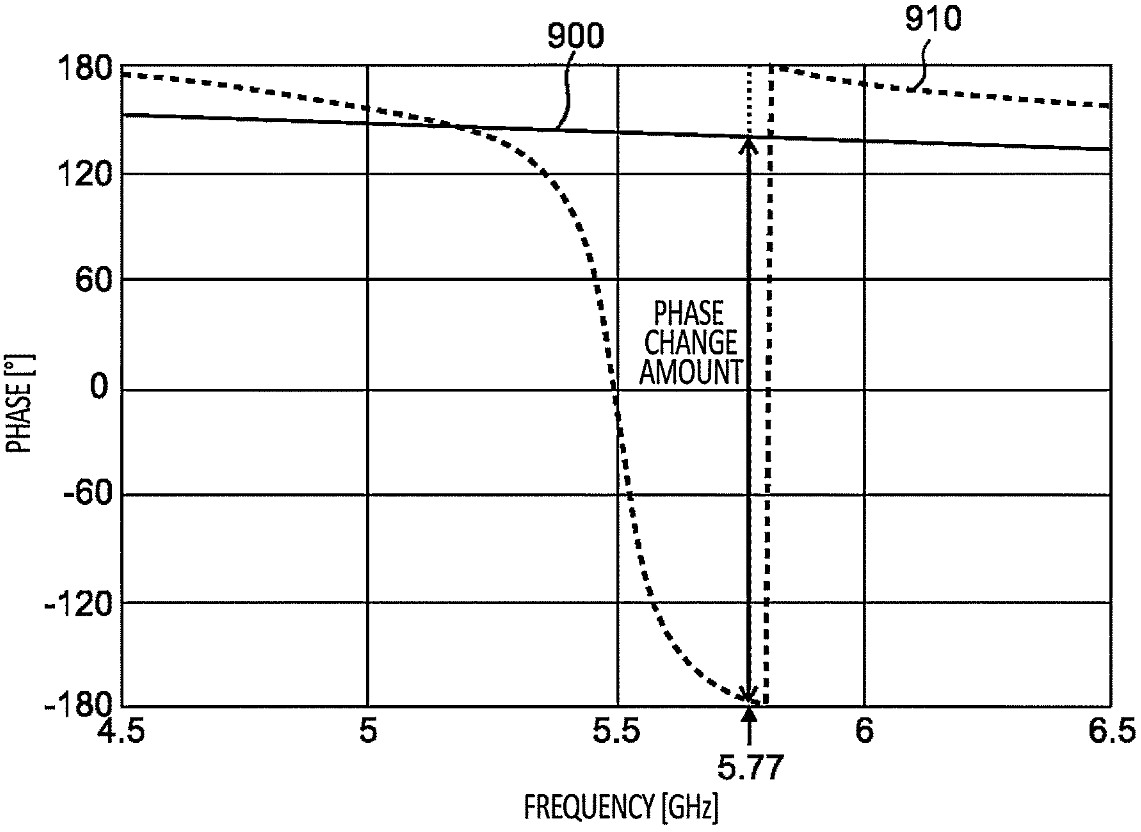
FIG. 9 is a graph showing a phase change amount in the first comparative example.

FIG. 9 is a graph showing a phase change amount in the first comparative example. As shown in FIG. 8, a line 900 indicates the phase of the reflected wave in a case where the position of the first base body 211 and the position of the second base body 221 are aligned. A line 910 indicates the phase of the reflected wave in a case where the position of the first base body 211 is set with respect to the second base body 221 such that the phase change amount is maximized at 5.77 GHz. As shown in FIG. 9, according to the configuration of the first comparative example, the phase change amount is 315.9°.

Figure 10:
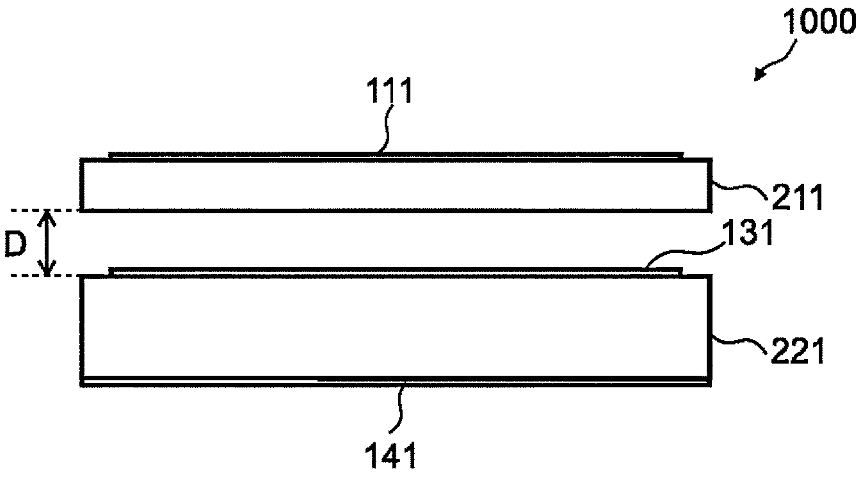
FIG. 10 schematically shows a unit 1000 included in a reflector in a second comparative example.

FIG. 10 schematically shows a unit 1000 included in a reflector in the second comparative example. The unit 1000 is a unit corresponding to the unit 301 shown in FIG. 6. The unit 1000 differs from the unit 301 in that the unit 1000 does not have the second element 121. According to the second comparative example, unlike the first comparative example, the position of the first base body 211 with respect to the second base body 221 can be displaced after manufacturing.

Figure 11:
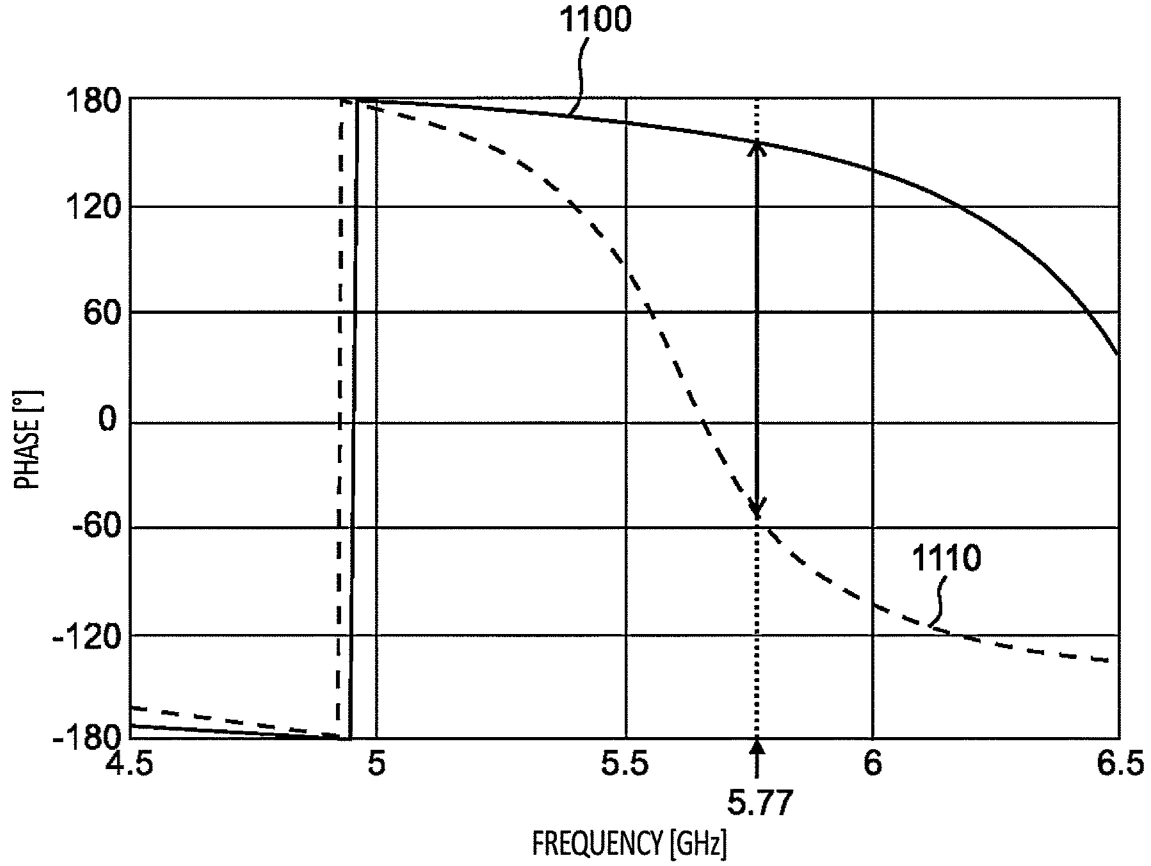
FIG. 11 is a graph showing a phase change amount in the second comparative example.

FIG. 11 is a graph showing a phase change amount in the second comparative example. As shown in FIG. 10, a line 1100 indicates the phase of the reflected wave in a case where the position of the first base body 211 and the position of the second base body 221 are aligned. A line 1110 indicates the phase of the reflected wave in a case where the position of the first base body 211 is displaced with respect to the second base body 221 such that the phase change amount is maximized at 5.77 GHz. As shown in FIG. 11, according to the configuration of the second comparative example, the phase change amount is 208.5°.

As can be seen from the comparison between the second comparative example and the first comparative example, the first base body 211 and the second base body 221 are separated from each other, so that the position of the first base body 211 can be displaced with respect to the second base body 221. However, the phase change amount decreases from 315.9° to 208.5°. That is, a range of a settable reflection angle is narrowed.

As can be seen from the comparison between the second comparative example and the reflection apparatus 30 described above, the phase change amount can be greatly expanded to 312.7° by providing the second element 121. That is, according to the reflection apparatus 30 described above, the first device 110 and the second device 120 are separated from each other, so that the first device 110 is allowed to be displaceable with respect to the second device 120 to allow the phase of the reflected wave to be adjustable, and it is possible to obtain the phase change amount equivalent to the phase change amount 315.9° obtained by the first comparative example.

Next, a modification of the reflection apparatus 30 described above will be described. In the reflection apparatus 30 described above, a length of one side of the plurality of first units included in the first device 110 is 0.38λ, where λ is a wavelength of a radio wave incident on the reflection apparatus 30. However, the length of one side of the first unit is not limited to this value, and an arbitrary value of a length of 0.3λ or more and 0.6λ or less can be applied as the length of one side of each of the plurality of first units included in the first device 110, where λ is a wavelength of a radio wave incident on the reflection apparatus 30.

In the reflection apparatus 30 described above, the shapes of the plurality of first elements including the first element 111, the plurality of second elements including the second element 122, and the plurality of third elements including the third element 131 are square. However, the shapes of the first element, the second element, and the third element are not limited to being square. The first element, the second element, and the third element may have a polygonal shape or a shape curved at least in part.

In the reflection apparatus 30 described above, a plurality of first base bodies including the first base body 211 and a plurality of second base bodies including the second base body 221 are square. However, the shapes of the first base body and the second base body are not limited to being square. The first base body and the second base body may have a polygonal shape or a shape curved at least in part.

In the reflection apparatus 30 described above, the plurality of first elements including the first element 111 may transmit a specific linearly polarized wave or a specific circularly polarized wave. The plurality of second elements including the second element 122 may transmit a specific linearly polarized wave or a specific circularly polarized wave.

In the system 10 described above, the base station 20 is an example of a radio wave radiation apparatus that radiates a radio wave incident on the reflection apparatus 30. A reflection apparatus having the configuration included in the reflection apparatus 30 can be applied as a reflection apparatus that reflects a radio wave radiated from a radio wave radiation apparatus other than the base station 20 for mobile communication described above.

While the present invention has been described by way of the embodiments, the technical scope of the present invention is not limited to the scope described in the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process executed by a device, system, program, and method shown in the claims, embodiments, or diagrams can be achieved in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be executed in this order.

EXPLANATION OF REFERENCES

10: system; 20: base station; 30: reflection apparatus; 34: adjustment apparatus; 101: first surface; 102: second surface; 103: third surface; 104: fourth surface; 110: first device; 120: second device; 111, 112, 113, 114: first element; 121: second element; 131: third element; 141: fourth element; 101: first surface; 102: second surface; 103: third surface; 104: fourth surface; 211: first base body; 221: second base body; 311: first unit; 321: second unit.

What is claimed is:

1. A reflection apparatus which reflects a radio wave, comprising a first device and a second device which are provided along an emission direction of a reflected wave, wherein the first device includes a plurality of first units each including a first base body which has a first surface and a second surface provided along the emission direction of the reflected wave, a first element which is provided on the first surface, and a second element which is provided on the second surface to be shifted in position from the first element in the emission direction of the reflected wave, the second device includes a plurality of second units each including a second base body which has a third surface and a fourth surface provided along the emission direction of the reflected wave, a third element which is provided on the third surface, and a fourth element which is provided on the fourth surface, and the first device is provided separated from the second device, and a relative positional relationship between the first device and the second device in a direction along the second surface is adjustable.

2. The reflection apparatus according to claim 1, wherein a phase of the reflected wave is determined by surface areas of the first element and the second element, a relative positional relationship between the first element and the second element, a thickness of the first base body, surface areas of the third element and the fourth element, and a thickness of the second base body.

3. The reflection apparatus according to claim 2, wherein the plurality of first units and the plurality of second units are provided at a plurality of positions along a specific direction along the first surface, such that phases of the reflected wave are different from each other.

4. The reflection apparatus according to claim 2, wherein the plurality of first units and the plurality of second units are provided such that the reflected wave propagates in a specific direction.

5. The reflection apparatus according to claim 2, further comprising an adjustment apparatus which adjusts a relative positional relationship between the first device and the second device.

6. The reflection apparatus according to claim 2, wherein a length of one side of each of the plurality of first units is 0.3λ or more and 0.6λ or less where λ is a wavelength of a radio wave incident on the reflection apparatus.

7. The reflection apparatus according to claim 2, wherein the first element, the second element, and the third element each have a polygonal shape or a shape curved at least in part.

8. The reflection apparatus according to claim 2, wherein the first element transmits a specific linearly polarized wave or a specific circularly polarized wave.

9. The reflection apparatus according to claim 2, wherein the first base body and the second base body each have a polygonal shape or a shape curved at least in part.

10. The reflection apparatus according to claim 1, wherein the plurality of first units and the plurality of second units are provided at a plurality of positions along a specific direction along the first surface, such that phases of the reflected wave are different from each other.

11. The reflection apparatus to claim 10, wherein the plurality of first units and the plurality of second units are provided such that the reflected wave propagates in a specific direction.

12. The reflection apparatus according to claim 10, further comprising an adjustment apparatus which adjusts a relative positional relationship between the first device and the second device.

13. The reflection apparatus according to any one of claim 1 wherein the plurality of first units and the plurality of second units are provided such that the reflected wave propagates in a specific direction.

14. The reflection apparatus according to any one of claim 1, further comprising an adjustment apparatus which adjusts a relative positional relationship between the first device and the second device.

15. The reflection apparatus according to any one of claim 1, wherein a length of one side of each of the plurality of first units is 0.3λ or more and 0.6λ or less where λ is a wavelength of a radio wave incident on the reflection apparatus.

16. The reflection apparatus according to any one of claim 1, wherein the first element, the second element, and the third element each have a polygonal shape or a shape curved at least in part.

17. The reflection apparatus according to any one of claim 1, wherein the first element transmits a specific linearly polarized wave or a specific circularly polarized wave.

18. The reflection apparatus according to any one of claim 1, wherein the first base body and the second base body each have a polygonal shape or a shape curved at least in part.

19. The reflection apparatus according to any one of claim 1, wherein the first element and the third element are conductors having a frequency selective surface (FSS).

20. A system comprising:

the reflection apparatus according to any one of claim 1; and a radio wave radiation apparatus which radiates a radio wave incident on the reflection apparatus.

* * * * *